United States Patent Office 3,452,600
Patented July 1, 1969

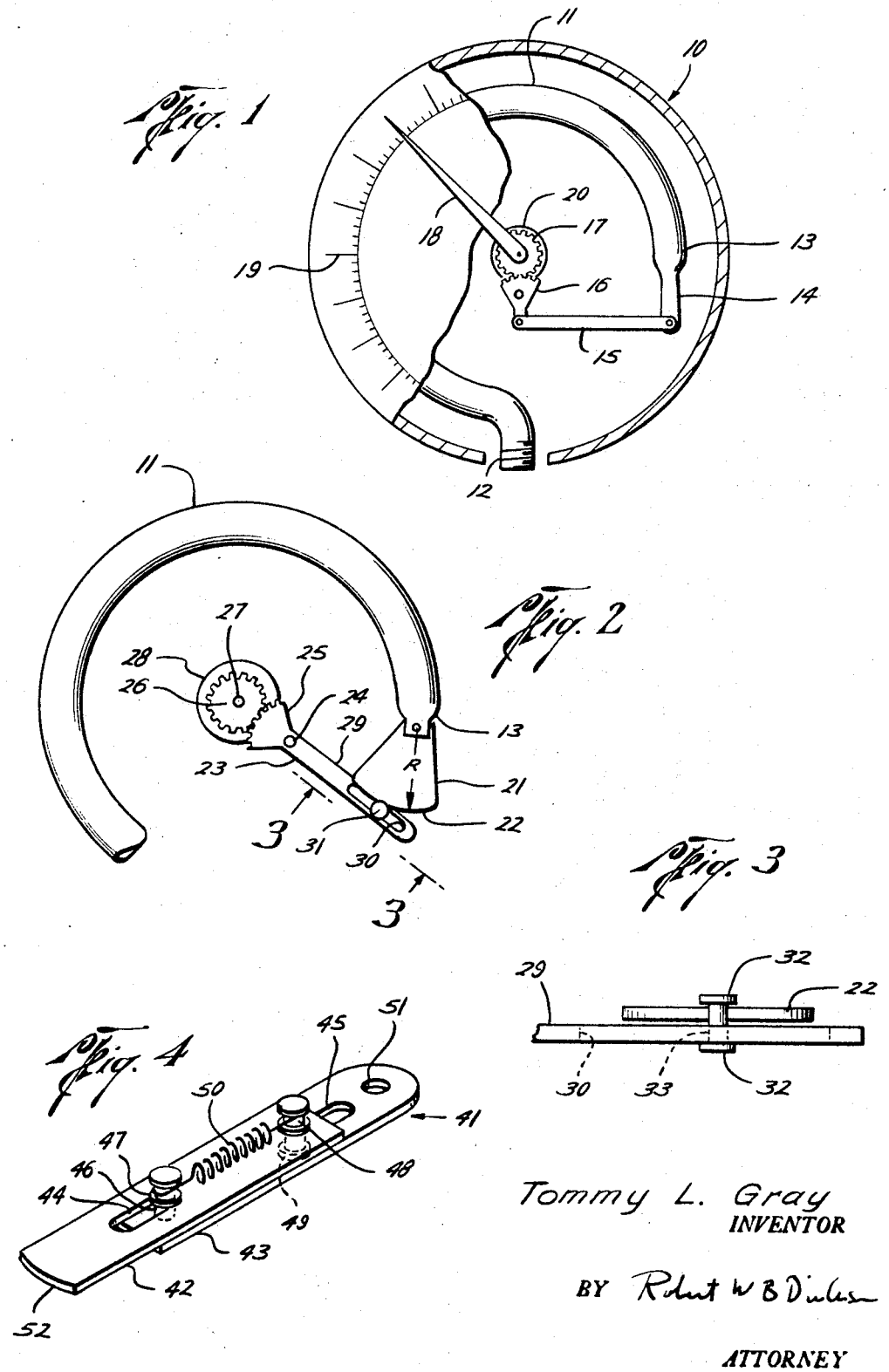

3,452,600
BOURDON TUBE LINK
Tommy L. Gray, Dallas, Tex., assignor to General Electrodynamics Corporation, Garland, Tex., a corporation of Texas
Filed Jan. 30, 1967, Ser. No. 612,455
Int. Cl. G01l 7/04
U.S. Cl. 73—411                      1 Claim

ABSTRACT OF THE DISCLOSURE

A link affixed to one end of a Bourdon tube. The link includes an arcuate surface which rides or abuts against a smooth surface of a member which is received in a slot within a portion of a segment. The pivotal segment in turn meshes with a pinion so as to operate a pointer proportionate to pressure caused deflection of the Bourdon tube. An embodiment includes a two part link, the parts being slidably linked together and spring biased.

Summary of the invention

This invention concerns a new and improved gauge of the Bourdon tube type. More specifically, it comprises an improved linkage between the flattened Bourdon tube and the indicating mechanism, that results in reduced friction among the components, and permits fast response particularly useful in dynamic weighing. One embodiment permits speedy return of the Bourdon tube to its unstressed position without damage to the delicately balanced linked assembly. Thus, this invention has as an object the provision of a gauge, utilizing a Bourdon tube, having reduced friction between its component parts. A further object is the provision of a gauge with faster response than that previously possible. These and still further objects and purposes will become apparent on considering the following appended description and drawings in which:

FIGURE 1 is a partly broken away plan of a generalized Bourdon tube gauge, without the linkage of this invention;

FIGURE 2 is a plan similar to FIGURE 1, having the linkage of this invention, the case and cover being removed and the tube partly broken away;

FIGURE 3 is a section of the linkage assembly, taken along lines 3—3 of FIGURE 2; and FIGURE 4 is a perspective of a modified linkage assembly.

Gauges utilizing a Bourdon type tube have long been used in such manners as for weighing objects. A typical such gauge 10, as shown in FIGURE 1, includes flattened tube 11, having access at one end 12 to a conduit (not shown) for fluid, such as air under pressure. On an object being weighed, for example, pressure caused by such an object will cause fluid to enter tube 11 through its end 12. This results in the tube attempting to straighten itself, i.e., the other end of tube 11 tending to move counter-clockwise, as shown in FIGURE 1. Said other end 13, by virtue of end piece or link 14, may be joined to further linkage 15, which in turn is pivotally connected to segment 16. Said segment in turn meshes with pinion 17 which is fixed to the shaft of pointer 18. Thus, as pressure builds up within tube 11, it tends to uncoil, causes segment 16 to pivot thereby rotating pinion 17, and, thereby rotates pointer 18 to indicate on scale 19 the pressure or weight encountered. It should be noted that hair spring 20 tends to return the mechanism to a null position.

It is noted that at the various connections between parts, as described above, especially at the pin connections such as between members 14, 15, frictional losses may, and do occur. Consider now the representation of FIGURE 2, showing the improvement of this invention. The ase, pointer and scale are not shown, they being unimportant for the purposes of this invention. Tube 11 is fixedly joined at end 13 to link 21, having arcuate end 22 of a radius R. Segment 23 is seen to be pivotally fixed to the case (not shown) at 24. End 25 of said segment is provided with teeth to engage pinion 26, said pinion being affixed to and rotatable along with pointer shaft 27. Hair spring 28 may also be joined to both the pointer shaft and case, so as to bias pinion 28 in a manner so as to tend to keep member 31 (hereinafter described) in contact with arcuate end 22 of link 21.

Opposite toothed portion 25, segment 23 includes an extension or lug 29. Said extension includes a slot 30, extending therethrough. Extending through said slot is rivet-like member 31 which may have heads 32 on either side, connected by round, smooth shaft 33 of only slightly less diameter than the width of slot 30, so as to be able to be clamped therein. This member 31, herein deemed a follower, is adjustably fixed within slot 30. The means for so fixing the follower may be of any suitable type, and is not important for this invention. Arcuate end 22 of link 21 is seen to bear against the upper smooth portion of shaft 33, intermediate one of heads 32 and the upper surface of segment 23. In operation, as pressurized fluid tends to cause tube 11 to unbend, extension 29 and member 31, which acts as a follower, follows the movement of tube end 13 and arcuate link 21, the segment pivoting at 24. Thus, as segment 23 moves counterclockwise (in FIGURE 2), the pinion 26 is rotated clockwise, along with pointer shaft 27 and its pointer so as to provide a reading on a dial such as 19 in FIGURE 1. It should be noted that by virtue of curved end 22 bearing against round shaft 33, frictional losses are held to a minimum, resulting in a more accurate reading than was previously possible. This is true because of the free connection, i.e., absence of a pin connecting link 21 to segment 23. Further, movement of the pointer is proportionate to movement of follower 31 about the arc of a circle having as a radius the distance between the follower and pin 24. The motion, in turn, of end 13 of tube 11 approximates that of an involute curve. Thus, providing link 21 with an arcuate end, having radius R, more readily permits the pointer deflection to be proportioned to pressure within tube 11 than would be possible, for example, were end 22 straight.

Move now to the modification of FIGURE 4. A further problem has been encountered, specifically when a gauge of this type is used in dynamic weighing, i.e., when a load is suddenly applied, or more to the point, suddenly removed. It will be noted that on pressure being suddenly removed from tube 11, it will very quickly return to its initial unstressed position. Although the actual distance moved may be relatively slight, such quick movement may result in hair spring 28 becoming sprung, thereby disabling the scale until repair is made. Bi-level linkage 41 may be substituted for member 21 of FIGURES 2 and 3. It includes slidably engaged upper and lower plates 42 and 43, each having a slot such as 44 and 45 extending therethrough and located toward one end of each of the respective plates. Connector 46 is affixed to one end of lower plate 43 and its shaft portion is slidably received within slot 44, and includes cap 47 to limit vertical displacement between plates 42 and 43. Likewise, connector 48 is affixed to one end of upper plate 42 and its shaft portion (shown only in dotted lines) is slidably received within slot 45 of the lower plate, said connector also including cap portion 49, for a function similar to that of member 47. Said connectors 46, 48 are yieldably linked by spring 50. Lower plate 43 may be fixedly joined to tube 11, at 51 just as link 21 is so joined in FIGURE 2 to end 13 of tube 11. Upper plate 42 includes an arcuately configured end 52 like that of end 22 in FIGURE 2. The operation of this modified link is like that of FIGURES 2 and 3, and therefore will not be repeated, other than as follows. When a load is suddenly removed, were the tube 11 and the link such as 21 or 41 to suddenly return to their unstressed position, hair spring 28 would be quickly stressed. This modification aborts such quick stress. Inasmuch as the follower 31 is in contact with the arcuate end 52 of plate 42, when end 13 suddenly moves clockwise, as in FIGURE 2, lower plate 43 may slide toward end 52 relative to upper plate 42. This will result in placing spring 50 under tension which will in time tend to pull upper plate 42 to its natural, more extended position relative to the lower plate. Surface 52 being in contact with follower 31, this slower extension will result in returning segment 23 to its null position in a slower manner, and thereby will protect hair spring 28. To a minor extent the reverse of such operation may occur when pressure is suddenly applied, by cushioning any abrupt contact between follower 31 and end 52 but the principal benefits occur during abrupt removal of a load.

Although limited embodiments have been described, it should be obvious that numerous modifications would be possible by one skilled in the art without departing from the spirit of the invention.

What is claimed is:

1. In a gauge having a Bourdon tube, a pointer positioned on a shaft, a pointer shaft activating gear fixed to said pointer shaft, and a gear rotating element engageable with said gear, the improvement comprising:

first means, affixed to the movable end of said tube, for causing said gear rotating element to rotate about a fixed point, said first means comprising a link having an arcuate end opposite its point of being affixed to said movable tube end, said arcuate end of said first means being movably engageable with follower means, said follower means being received and fixed within a slot contained in said gear rotating element near-one end of said element, and said arcuate end being so contoured that movement of said movable end of said tube permits movement of said follower means proportional to said movable end movement.

References Cited

UNITED STATES PATENTS

| | | | |
|---|---|---|---|
| 564,957 | 7/1896 | Hart | 73—411 |
| 1,070,392 | 8/1913 | Benecke | 73—411 |
| 2,178,538 | 11/1939 | Erbguth | 74—582 |
| 3,257,852 | 6/1966 | Perkins | 73—414 |

LOUIS R. PRINCE, *Primary Examiner.*

DENISE E. CORR, *Assistant Examiner.*